United States Patent
Gaal et al.

(10) Patent No.: US 8,929,393 B2
(45) Date of Patent: Jan. 6, 2015

(54) METHOD AND APPARATUS FOR COMMUNICATION WITH SHORTENED SIGNAL FORMATS

(75) Inventors: Peter Gaal, San Diego, CA (US); Juan Montojo, San Diego, CA (US); Wanshi Chen, San Diego, CA (US); Aleksandar Damnjanovic, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 434 days.

(21) Appl. No.: 13/099,184

(22) Filed: May 2, 2011

(65) Prior Publication Data

US 2012/0106372 A1 May 3, 2012

Related U.S. Application Data

(60) Provisional application No. 61/330,847, filed on May 3, 2010.

(51) Int. Cl.
*H04J 3/16* (2006.01)
*H04W 72/08* (2009.01)
*H04L 1/00* (2006.01)
*H04B 1/7097* (2011.01)
*H04J 11/00* (2006.01)

(52) U.S. Cl.
CPC ........... *H04W 72/082* (2013.01); *H04L 1/0006* (2013.01); *H04L 1/0084* (2013.01); *H04L 1/0083* (2013.01); *H04B 1/7097* (2013.01); *H04J 11/003* (2013.01); *H04J 11/0036* (2013.01); *H04L 1/003* (2013.01); *H04L 1/0085* (2013.01); *H04L 1/0028* (2013.01); *H04L 1/0079* (2013.01); *H04L 1/0078* (2013.01)
USPC ........................................................ 370/468

(58) Field of Classification Search
CPC ..... H04L 1/0006; H04L 1/0028; H04L 1/003; H04L 1/0078; H04L 1/0079; H04L 1/0083; H04L 1/0084; H04L 1/0085
USPC ........................................................ 370/468
See application file for complete search history.

(56) References Cited

U.S. PATENT DOCUMENTS 6,278,685 B1 8/2001 Yonge, III
2002/0137464 A1* 9/2002 Dolgonos et al. ............... 455/60
(Continued)

FOREIGN PATENT DOCUMENTS

EP 1881629 A1 1/2008
JP 2003507930 A 2/2003
(Continued)

OTHER PUBLICATIONS

International Search Report and Written Opinion—PCT/US2011/035022—ISA/EPO—Sep. 30, 2011.

(Continued)

*Primary Examiner* — Peter Cheng
(74) *Attorney, Agent, or Firm* — Dalei Dong

(57) ABSTRACT

Techniques for addressing high interference observed by a receiver in a wireless communication system are disclosed. The receiver may observe different interference power levels across a transmission symbol. In an aspect, the receiver applies different weights to different portions of the transmission symbol to account for fluctuation of interference power across the transmission symbol. In another aspect, a transmitter may send a transmission symbol such that a receiver can ignore a portion of a symbol period with high interference. In one design, the transmitter generates a transmission symbol including at least two copies of a signal component. The transmitter transmits at least one copy of the signal component in a portion of the symbol period in which the receiver does not observe high interference. The receiver processes the at least one copy of the signal component to recover data sent in the transmission symbol.

27 Claims, 9 Drawing Sheets

(56) References Cited

U.S. PATENT DOCUMENTS

| | | |
|---|---|---|
| 2003/0099304 A1 | 5/2003 | Gore et al. |
| 2006/0198292 A1 | 9/2006 | Yoshii et al. |
| 2008/0112518 A1* | 5/2008 | Wilhelmsson ................ 375/348 |
| 2009/0103648 A1 | 4/2009 | Fukuoka et al. |
| 2009/0135972 A1 | 5/2009 | Tanaka et al. |
| 2009/0196237 A1* | 8/2009 | Jonsson ........................ 370/329 |
| 2009/0274036 A1* | 11/2009 | Lin et al. ....................... 370/208 |
| 2009/0310589 A1* | 12/2009 | Nangia et al. ................. 370/344 |
| 2010/0002813 A1 | 1/2010 | He et al. |
| 2013/0201944 A1 | 8/2013 | Kishigami et al. |

FOREIGN PATENT DOCUMENTS

| | | |
|---|---|---|
| WO | 2006129585 A1 | 12/2006 |
| WO | 2007049547 A1 | 5/2007 |
| WO | 2010002323 A1 | 1/2010 |

OTHER PUBLICATIONS

Yan Meng et al: "A Novel Space-Frequency Block Coding Scheme for SC-FDMA", Vehicular Technology Conference Fall (VTC 2009-FALL), 2009 IEEE 70TH, IEEE, Piscataway, NJ, USA, Sep. 20, 2009, pp. 1-5, XP031600335, ISBN: 978-1-4244-2514.

* cited by examiner

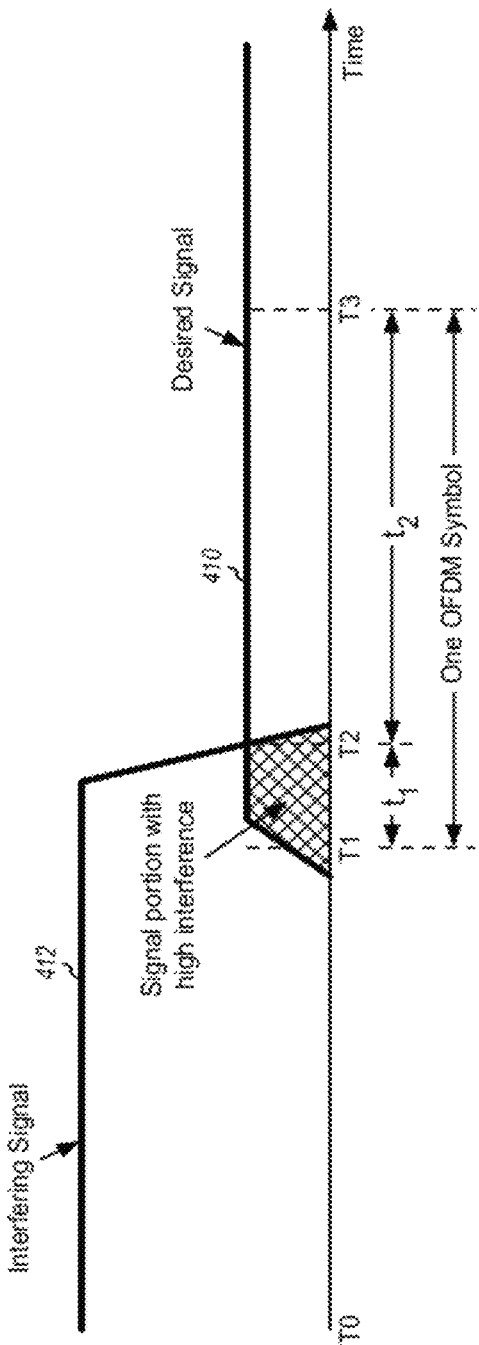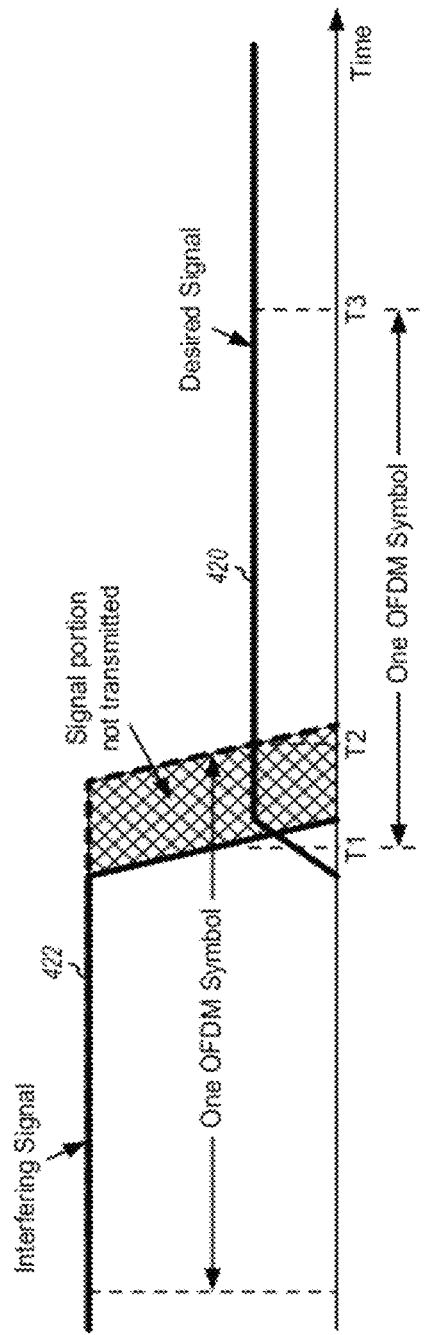

METHOD AND APPARATUS FOR COMMUNICATION WITH SHORTENED SIGNAL FORMATS

The present application claims priority to provisional U.S. Application Ser. No. 61/330,847, entitled "METHOD AND APPARATUS FOR COMMUNICATION WITH SHORTENED SIGNAL FORMATS," filed May 3, 2010, and incorporated herein by reference in its entirety.

BACKGROUND

I. Field

The present disclosure relates generally to communication, and more specifically to techniques for supporting wireless communication.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. The UE may also be able to communicate peer-to-peer with one or more other UEs.

A receiver (e.g., a UE) may observe high/strong interference from one or more interfering transmitters. The high interference may adversely impact performance of data transmission. It may be desirable to address the high interference such that good performance can be achieved.

SUMMARY

Techniques for addressing high interference observed by a receiver in a wireless communication system are described herein. The receiver may observe different interference power levels across a transmission symbol. Large fluctuation of interference power across the transmission symbol may degrade performance.

In an aspect, the receiver may apply different weights to different portions of a transmission symbol to account for fluctuation of interference power across the transmission symbol. In one design, the receiver may determine a signal power level of the transmission symbol, determine a first interference power level for a first portion of the transmission symbol, and determine a second interference power level for a second portion of the transmission symbol. The receiver may determine a first weight based on the signal power level and the first interference power level and determine a second weight based on the signal power level and the second interference power level. The receiver may scale the first and second portions of the transmission symbol based on the first and second weights, respectively. In general, the receiver may give greater weight to a portion of the transmission symbol observing less interference and lower weight to another portion of the transmission symbol observing more interference.

In another aspect, a transmitter may send a transmission symbol such that a receiver can ignore a portion of a symbol period with high interference. In one design, the transmitter may receive information indicative of the receiver observing high interference in the portion of the symbol period. The transmitter may generate a transmission symbol including at least two copies of a signal component. The transmitter may transmit at least one copy of the signal component of the transmission symbol in the symbol period. The at least one copy of the signal component may be non-overlapping with the portion of the symbol period in which the receiver observes high interference. The receiver may receive and process the at least one copy of the signal component of the transmission symbol to recover data sent in the transmission symbol.

Various aspects and features of the disclosure are described in further detail below.

BRIEF DESCRIPTION OF THE DRAWINGS

FIG. 4A shows large fluctuation of interference power across an OFDM symbol.

FIG. 4B shows mitigation of large fluctuation of interference power.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP).

cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE.

Figure 1:
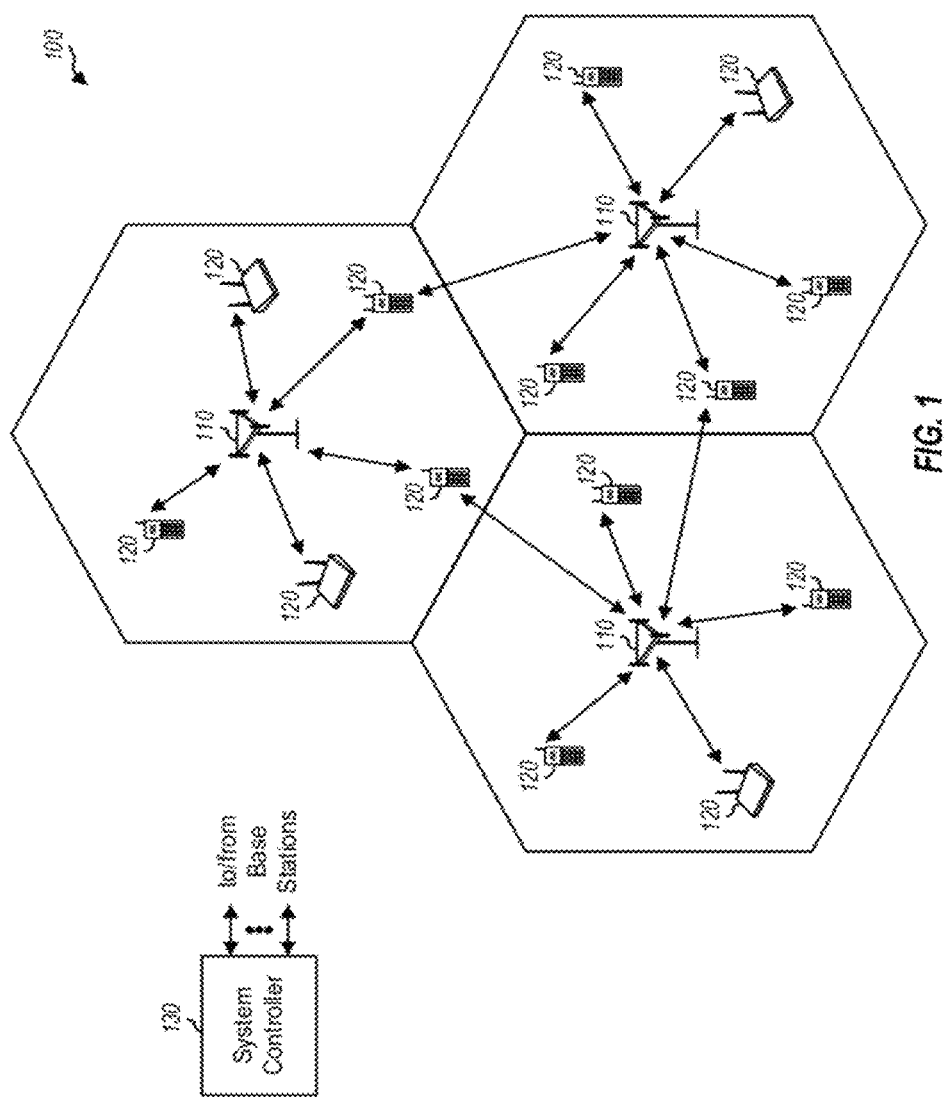
FIG. 1 shows a wireless communication system.

FIG. 1 shows a wireless communication system 100, which may be a LTE system or some other system. System 100 may include a number of base stations and other network entities. A base station may be an entity that communicates with the UEs and may also be referred to as a Node B, an evolved Node B (eNB), an access point, etc. Each base station 110 may provide communication coverage for a particular geographic area. To improve system capacity, the overall coverage area of a base station may be partitioned into multiple (e.g., three) smaller areas. Each smaller area may be served by a respective base station subsystem. In 3GPP, the term "cell" can refer to a coverage area of a base station and/or a base station subsystem serving this coverage area. In 3GPP2, the term "sector" or "cell sector" can refer to a coverage area of a base station and/or a base station subsystem serving this coverage area. For clarity, 3GPP concept of cell is used in the description below.

System 100 may be (i) a homogeneous network that includes base stations of the same type, e.g., only macro base stations, or (ii) a heterogeneous network that includes base stations of different types, e.g., macro base stations, pico base stations, home/femto base stations, etc. These different types of base stations may have different transmit power levels, different association types, different coverage areas, and different impact on interference in system 100. For example, macro base stations may have a high transmit power level (e.g., 5 to 40 Watts) whereas pico and home base stations may have lower transmit power levels (e.g., 0.1 to 2 Watts). System 100 may also include relays. A relay may be an entity that can receive a transmission of data from an upstream station (e.g., a base station or a UE) and send a transmission of the data to a downstream station (e.g., a UE or a base station).

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smartphone, a netbook, a smartbook, a tablet, etc. A UE may communicate with a base station via the downlink and uplink. A UE may also be able to communicate peer-to-peer with one or more other UEs.

A system controller 130 may couple to a set of base stations and may provide coordination and control for these base stations. System controller 130 may be a single network entity or a collection of network entities. System controller 130 may communicate with the base stations via a backhaul. The base stations may also communicate with one another, e.g., directly or indirectly via a wireless or wireline backhaul.

System 100 may utilize frequency division duplexing (FDD) or time division duplexing (TDD). For FDD, the downlink and uplink may be allocated two separate frequency channels, and transmissions may be sent concurrently on the downlink and uplink via the two frequency channels. For TDD, the downlink and uplink may share the same frequency channel, and transmissions may be sent on the downlink and uplink on this frequency channel in different time intervals.

Figure 2:
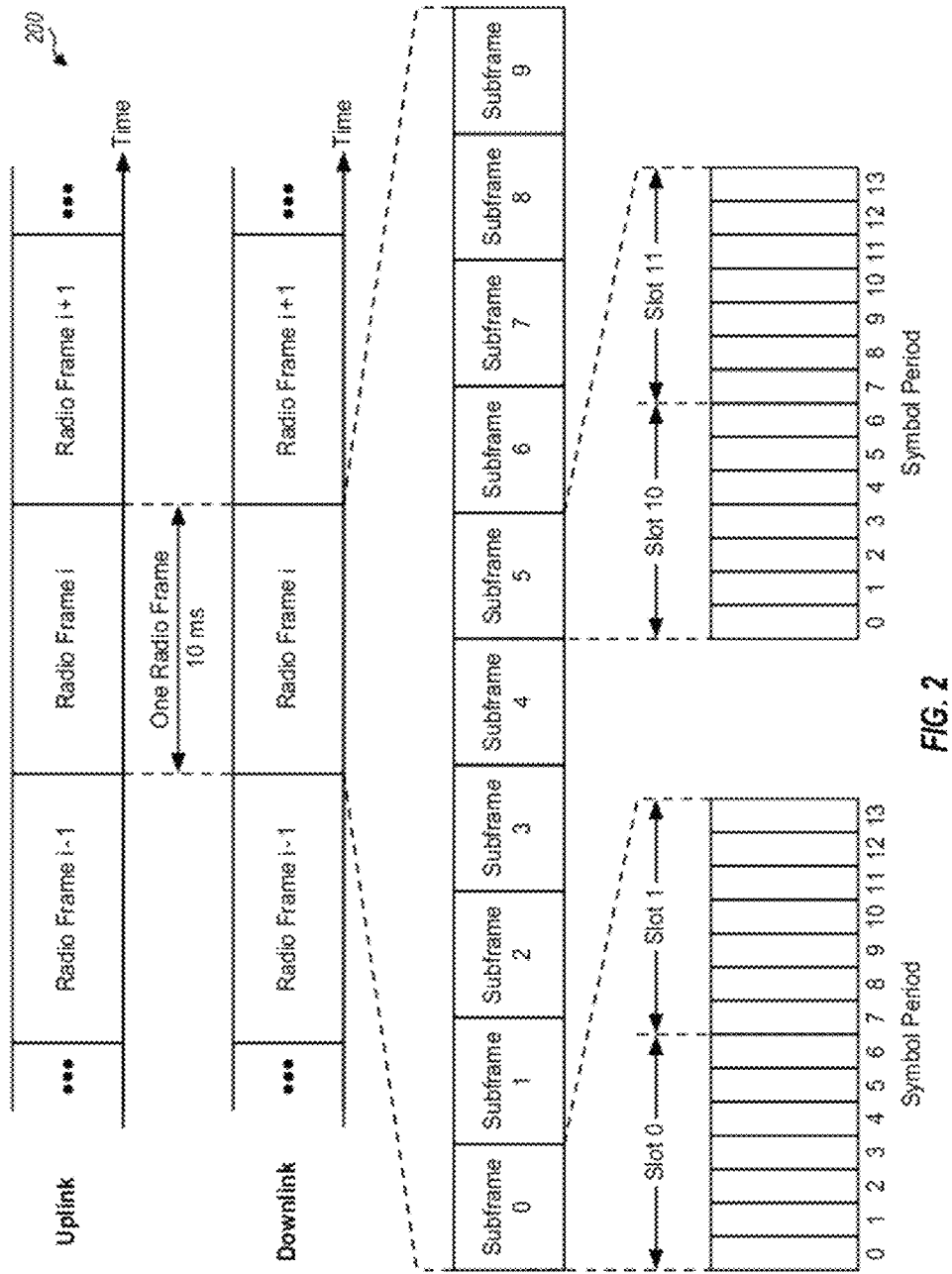
FIGS. 2 and 3 show two exemplary frame structures.

FIG. 2 shows a frame structure 200 used for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

Figure 3:
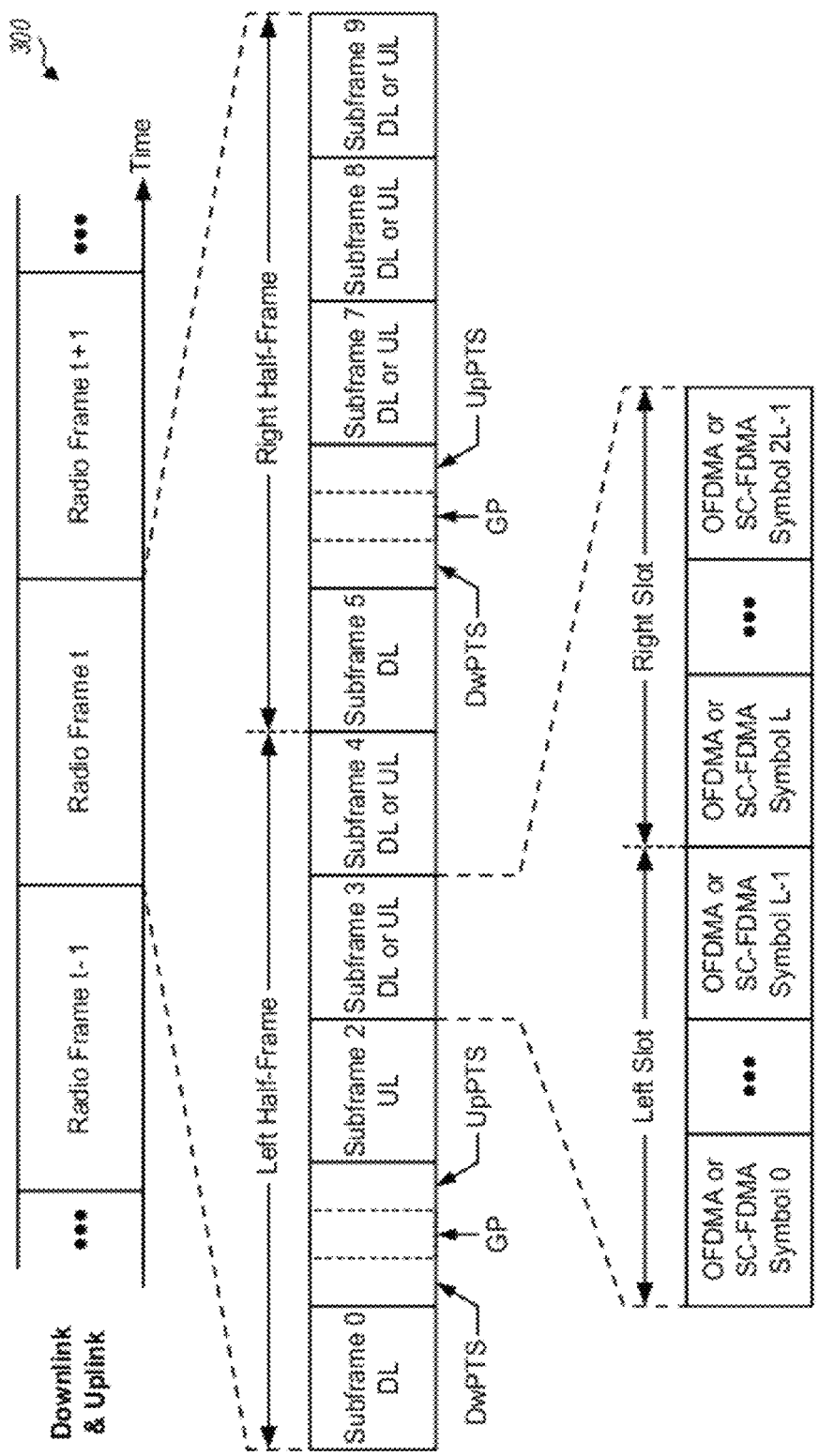

FIG. 3 shows a frame structure 300 used for TDD in LTE. The transmission timeline may be partitioned into units of radio frames, and each radio frame may be partitioned into 10 subframes with indices of 0 through 9. LTE supports a number of downlink-uplink configurations for TDD. Subframes 0 and 5 are used for the downlink (DL) and subframe 2 is used for the uplink (UL) for all downlink-uplink configurations. Subframes 3, 4, 7, 8 and 9 may each be used for the downlink or uplink depending on the downlink-uplink configuration. Subframe 1 includes three special fields composed of a Downlink Pilot Time Slot (DwPTS) used for downlink control channels as well as data transmission, a Guard Period (GP) of no transmission, and an Uplink Pilot Time Slot (UpPTS) used for either a random access channel (RACH) or a sounding reference signals (SRS). Subframe 6 may include only the DwPTS, or all three special fields, or a downlink subframe depending on the downlink-uplink configuration. The DwPTS, GP and UpPTS may have different durations for different subframe configurations.

LTE utilizes orthogonal frequency division multiplexing (OFDM) on the downlink and single-carrier frequency division multiplexing (SC-FDM) on the uplink for both FDD and TDD. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, the subcarrier spacing may be 15 kilohertz (KHz), and $N_{FFT}$ may be equal to 128, 256, 512, 1024 or 2048 for system bandwidth of 1.4, 3, 5, 10 or 20 megahertz (MHz), respectively.

For both FDD and TDD, an OFDM symbol (which may also be referred to as an OFDMA symbol) may be transmitted in each symbol period of a subframe for the downlink. An SC-FDMA symbol may be transmitted in each symbol period of a subframe for the uplink. An OFDMA symbol may be generated by (i) mapping modulation symbols to subcarriers used for transmission and mapping zero symbols with a signal value of zero to the remaining subcarriers, (ii) performing an inverse fast Fourier transform (IFFT) on the mapped symbols to obtain time-domain samples, and (iii) appending a cyclic prefix to obtain an OFDMA symbol. A SC-FDMA symbol may be generated by (i) performing a discrete Fourier transform (DFT) on modulation symbols to be transmitted, (ii) mapping the DFT outputs to subcarriers used for transmission and zero symbols to the remaining subcarriers, (iii) performing an IFFT on the mapped symbols to obtain time-domain samples, and (iv) appending a cyclic prefix to obtain a SC-FDMA symbol. A SC-FDMA symbol may be generated with an additional DFT step that is not present in the generation of an OFDMA symbol.

In general, signals used for communication in a given system may be divided into smaller units, such as frames, subframes, symbols, chips, etc. An assumption often made at the design stage is that both a transmitter and a receiver are synchronized regarding data unit boundaries, such as symbol boundaries. Furthermore, for some smaller units such as symbols, an assumption is made that the receiver can assume that the characteristics of a desired signal and interference remain substantially unchanged within the time period of each such smaller unit. For example, an OFDM receiver may assume that the signal amplitude and interference power is not changing during a symbol period for an OFDM symbol. For clarity, much of the description below assumes that data may be sent in units of transmission symbols. A transmission symbol may be an OFDM symbol, a SC-FDMA symbol, a CDMA symbol, etc.

In some system deployments, the assumptions described above may not hold. For example, interference may come from an interfering cell operating asynchronous on the same frequency channel (or co-channel) as a serving cell. Interference power may fluctuate depending on scheduling changes that take effect at symbol boundaries of the interfering cell, which may not be time aligned with the symbol boundaries of the serving cell. Fluctuation of interference power can usually be ignored. However, when fluctuation of interference power is too large, or when a desired signal from the serving cell is changing, then excessive degradation in performance may occur.

Large fluctuation of interference power across a transmission symbol (e.g., an OFDM symbol) may occur in various operating scenarios. For example, in a first scenario, such large fluctuation may occur in a TDD system with an inadequate guard period. A guard period of no transmission is typically specified in the TDD system to provide sufficient time to switch from transmit to receive operation, and vice versa. In some cases, the guard period may not be sufficient for a UE, and a high level of a transmit signal may leak from a UE to a first portion of a receive signal at the UE or another UE. The guard period should also protect a receiver at the UE from transmit to receive (Tx-to-Rx) switch transients of other nearby UEs. For this to work, the UEs should be well synchronized. However, this synchronization may be difficult to achieve for UEs located in cell boundary regions, especially between cells of different sizes.

In a second scenario, large fluctuation of interference power across a transmission symbol may occur due to half-duplex operation by UEs. Some UEs may not have sufficient Tx-to-Rx isolation to enable these UEs to transmit and receive at the same time even on different frequency channels. These UEs may then operate in a half-duplex FDD mode and may (i) transmit in some time intervals on an uplink frequency channel and (ii) receive in other time intervals on a downlink frequency channel. However, a FDD system typically does not utilize guard periods. In this case, a base station may obtain a guard period for a UE by scheduling the UE such that the transmit and receive periods for the UE are separated by a guard period of at least one full subframe, with a subframe being the smallest unit of time in which the UE can be scheduled in LTE. In general, guard periods may be obtained for UEs by not scheduling these UEs for data transmission in some subframes. However, a base station may want to avoid the loss of full subframes and may thus schedule a half-duplex UE to transmit and receive in consecutive subframes, without a guard period between transmit and receive periods. This may then result in high self-interference in the first part of the first received OFDM symbol following a transmit period for the half-duplex UE.

In a third scenario, large fluctuation of interference power across a transmission symbol may occur due to operation in a heterogeneous network with base stations of different types. These different types of base stations may have different transmit power levels and different types of association. A UE may communicate with a serving base station whose desired signal may be received at a level well below those of interfering signals from other base stations. In this case, time-domain resource partitioning may be used, and the interfering base stations may stop transmitting on a periodic basis to allow reception of the weaker desired signal by the UE. This assumes synchronization of different base stations (or base stations of different classes). However, the synchronization should be maintained at the receivers/UEs (and not at the transmitters/base stations) in order to avoid interference at the receivers/UEs. It may be difficult to maintain synchronization at a number of different receivers at the same time, especially when different receivers may be associated with different propagation delays to their transmitters.

In a fourth scenario, large fluctuation of interference power across a transmission symbol may occur due to over-the-air relaying. A relay may operate in a FDD system and may communicate with a donor base station via a backhaul link and communicate with one or more UEs via an access link. For data transmission on the downlink, the relay may receive data from the donor base station on a downlink frequency channel in some subframes and may transmit data to one or more UEs on the downlink frequency channel in some other subframes. The relay may need to switch between transmit and receive operations on the downlink frequency channel, in similar manner as in a TDD system. However, the FDD system may have no guard periods to accommodate Tx-to-Rx and Rx-to-Tx switches at the relay. The switch time may delay all transmission symbols of the access link compared to the backhaul link, or vice versa, or parts of a transmission symbol after a switch may be erased or lost.

Large fluctuation of interference power across a transmission symbol may also occur in other operating scenarios. In all scenarios, large fluctuation of interference power may degrade performance of a receiver and should be mitigated in order to avoid excessive degradation.

FIG. 4A shows an example of large fluctuation of interference power across an OFDM symbol. A receiver (e.g., a UE) may receive a desired signal 410 at a first received signal level starting at time T1. The receiver may also receive an interfering signal 412 at a second received signal level, which may be much higher than the first received signal level. Interfering signal 412 may be received starting prior to time T1 and concluding at time T2. In FIG. 4A, no mitigation actions may be taken to avoid overlapping of interfering signal 412 and desired signal 410. Hence, the first portion of desired signal 410 from time T1 to time T2 may observe high interference from interfering signal 412. High/strong interference may be quantified by interference power exceeding a particular threshold or based on some other criteria.

FIG. 4B shows an example of mitigation of large fluctuation of interference power across an OFDM symbol. A receiver (e.g., a UE) may receive a desired signal 420 at a first received signal level starting at time T1. The receiver may also receive an interfering signal 422 at a second received signal level, which may be much higher than the first received signal level. Interfering signal 422 may be received starting prior to time T1 and concluding at time T1. The last portion of interfering signal 422 from time T1 to time T2 is not transmitted. Hence, desired signal 420 may avoid observing high interference from interfering signal 422.

Not transmitting the last portion of interfering signal 422 may aid reception of desired signal 420 by the receiver. However, not transmitting the last portion of interfering signal 422 may create a similar problem for one or more other receivers attempting to receive and decode interfering signal 422, which may be the desired signal of the other receiver(s).

Hence, it may not be practical or feasible to stop transmitting the last portion of an interfering signal.

In an aspect, a receiver may apply different weights to different portions of a transmission symbol to account for fluctuation of interference power across the transmission symbol. In particular, the receiver may give (i) greater weight to a portion of the transmission symbol observing less interference and (ii) lower weight to another portion of the transmission symbol observing more interference. Unequal weighting of different portions of the transmission symbol based on observed interference may improve performance. This technique may be referred to as a transparent solution since involvement by a transmitter is not needed (i.e., is transparent to the transmitter). In general, the technique may be used for transmission symbols of any type. For clarity, application of the technique to an OFDM symbols is described below.

A receiver may determine that an OFDM symbol in a desired signal observes high interference in a first portion and lower interference in a second portion, e.g., as shown in FIG. 4A. The receiver may determine that the first portion of the OFDM symbol covers a time duration of $t_1$, has a signal power level of s, and observes an interference power level of $n_1$. The receiver may also determine that the second portion of the OFDM symbol covers a time duration of $t_2$, has a signal power level of s, and observes an interference power level of $n_2$.

In one design, the receiver may determine weights for the first and second portions of the OFDM symbol based on a minimum mean square error (MMSE) solution, as follows:

$$w_1 = \frac{s}{s+n_1}, \text{ and} \qquad \text{Eq (1)}$$

$$w_2 = \frac{s}{s+n_2}, \qquad \text{Eq (2)}$$

where $w_1$ is a weight for the first portion of the OFDM symbol, and $w_2$ is a weight for the second portion of the OFDM symbol.

The receiver may also determine the weights for different portions of the OFDM symbol based on other solutions. For example, in another design, the receiver may determine weights for the first and second portions of the OFDM symbol based on a maximum ratio combining (MRC) solution, as follows:

$$w_1 = \frac{s}{n_1}, \text{ and} \qquad \text{Eq (3)}$$

$$w_2 = \frac{s}{n_2}. \qquad \text{Eq (4)}$$

The receiver may apply the weighs to received samples of the OFDM symbol, as follows:

$$y(i) = w_1 * x(i), \text{ for } T1 \leq i \leq T2, \text{ and} \qquad \text{Eq (5)}$$

$$y(i) = w_2 * x(i), \text{ for } T2 < i \leq T3. \qquad \text{Eq (6)}$$

where x(i) is a received sample in sample period i, and
y(i) is a weighted sample for sample period i.

Applying different weights to different portions of an OFDM symbol may improve performance in various cases. In a first case, the OFDM symbol may have a very low signal-to-noise-and-interference ratio (SINR) in the first portion and a very high SINR in the second portion, so that $n_1 \gg s \gg n_2$. In this case, the weights may be computed as $w_1 \approx 0$ and $w_1 \approx 1$, and the resulting SINR may be expressed as $$SINR_{Case\_1} \approx \frac{t_2}{t_1}.$$

SINR for the first case may be largely independent of signal and interference power levels.

In a second case, the OFDM symbol may include no signal in the first portion and may have a very high SINR in the second portion. In this case, the weights may be computed as $w_1 = 0$ and $w_1 = 1$, and the resulting SINR may be expressed as $$SINR_{Case\_2} = \frac{t_2}{t_1}.$$

The second case is similar to the first case.

In a third case, the OFDM symbol may include no signal in the first portion and may have a low SINR in the second portion. In this case, the weights may be computed as $w_1 = 0$ and $w_1 = 1$, and the resulting SINR may be expressed as $$SINR_{Case\_3} = \frac{t_2}{t_1 + t_2} \cdot \frac{s}{n_2}.$$

For the third case, the SINR in the second portion is degraded by a factor of $$\frac{t_2}{t_1 + t_2},$$

which is the percentage of the OFDM symbol corresponding to the second portion. The amount of degradation increases for progressively smaller second portion of the OFDM symbol.

The weights and the resulting SINR may be calculated for other cases. In summary, SINR in an OFDM system experiencing high sub-symbol interference may be limited to $$SINR_{lim} = \frac{t_2}{t_1},$$

where $t_1$ is the duration of the OFDM symbol with high interference and $t_2$ is the duration of the OFDM symbol with low interference.

For simplicity, FIG. 4A and the description above assume an OFDM symbol having two portions observing different interference power levels. In general, an OFDM symbol may have any number of portions with different interference power levels. In the limit, each time-domain received sample of the OFDM symbol may be considered as a different portion of the OFDM symbol.

The receiver may identify portions of an OFDM symbol observing different interference power levels in various manners. In one design, the receiver may determine (i) the received power and timing of a desired signal from a desired transmitter and (ii) the received power and timing of an interfering signal from an interfering transmitter. The receiver may then combine all of the information to determine the desired signal level s, the interference power level $n_1$, and the durations $t_1$ and $t_2$ of the two portions of an OFDM symbol.

For the design described above, the receiver may determine the timing of the interfering transmitter at the receiver and may ascertain symbol boundary of the interfering transmitter based on the determined timing. The receiver may also measure the received power of the interfering transmitter, e.g., during a time period when the interfering transmitter is expected to be transmitting and not necessarily during the portion that overlap with the desired signal. For example, the receiver may measure the received power of the interfering transmitter between time T0 and time T1 in FIG. 4A, instead of between time T1 and time T2. The receiver may then determine the portion of the interfering signal that overlaps the desired signal based on (i) the timing of the interfering transmitter, which would indicate the symbol boundary of the interfering transmitter at time T2 in FIG. 4A, and (ii) the timing of the desired transmitter, which would indicate the symbol boundary of the desired transmitter at time T1 in FIG. 4A. The receiver may also determine the interference power level during the period from time T1 to time T2 based on the received power measured at some other time period, e.g., from time T0 to time T1.

In another design, the receiver may measure the received power of the first portion of the OFDM symbol from time T1 to time T2 in FIG. 4A to obtain an estimate of $s+n_1+n_2$. The receiver may also measure the received power of the second portion of the OFDM symbol from time T2 to time T3 to obtain an estimate of $s+n_2$. The receiver may then estimate $n_1$ based on the estimate of $s+n_1+n_2$ and the estimate of $s+n_2$. The receiver may estimate s based on a reference signal or pilot received from the desired transmitter. The receiver estimate $n_2$ based on the estimate of s and the estimate of $s+n_2$.

Two designs of estimating interference with sub-symbol resolution have been described above. Interference may also be estimated at sub-symbol resolution in other manners.

For clarity, unequal weighting of different portions of an OFDM symbol has been described above. Unequal weighting may also be applied to transmission symbols of other types, such as SC-FDMA symbols, CDMA symbols, etc. Unequal weighting for SC-FDMA symbols may be simpler than unequal weighting for OFDM symbols since a sequence of received modulation symbols obtained for an SC-FDMA symbol after receiver processing may be equivalent to a sequence of transmitted modulation symbols in the time domain. Hence, the received modulation symbols may be weighted by simply adjusting log-likelihood ratios (LLRs) computed based on the received modulation symbols. The weights for different portions of the SC-FDMA symbol may be computed based on MMSE (e.g., as shown in equations (1) and (2) above) or based on some other solutions.

Unequal weighting for CDMA symbols may also be performed in similar manner as for OFDM symbols. A modulation symbol may be spread with an orthogonal code of length N to obtain a CDMA symbol comprising a sequence of N spread samples. Multiple modulation symbols may be spread with different orthogonal codes (e.g., by the same transmitter or different transmitters) to obtain multiple CDMA symbols, which may be transmitted in the same symbol period. A receiver may determine weights for different portions of a CDMA symbol, apply the weights to received samples for different portions of the CDMA symbol, and despread the weighted samples to obtain a received modulation symbol. The receiver may experience inter-code interference for the CDMA symbol (instead of inter-subcarrier interference for an OFDM symbol) as a result of unequal weighting across the CDMA symbol.

As discussed above, the SINR of an OFDM symbol experiencing high interference in a portion of the OFDM symbol may be limited to $$SINR_{lim} \approx \frac{t_2}{t_1}.$$

Equivalently, the achievable capacity for the OFDM symbol may be expressed as:

$$C_{lim} = \log_2(1 + SINR_{lim}) = \log_2\left(\frac{t_1 + t_2}{t_1}\right), \quad \text{Eq (7)}$$

where $C_{lim}$ is the capacity in bits/second/Hertz corresponding to $SINR_{lim}$.

Theoretically, the achievable capacity $C_{theo}$ for the second portion of the OFDM symbol may be expressed as:

$$C_{theo} = \frac{t_2}{t_1 + t_2} \cdot \log_2\left(1 + \frac{s}{n_2}\right). \quad \text{Eq (8)}$$

Inefficient utilization of channel resources may occur when the SINR of the second portion of the OFDM symbol is high. For example, the first portion of the OFDM symbol observing high interference may be equal to the second portion of the OFDM symbol having a high SINR (or $t_1=t_2$), and the SINR of the second portion may be 20 dB (or $$\left(SINR = \frac{s}{n_2} = 20 \text{ dB}\right).$$

Capacity of the OFDM symbol with unequal weighting compared to the theoretically achievable capacity may then be expressed as:

$$\frac{C_{lim}}{C_{theo}} = \frac{\log_2\left(\frac{t_1 + t_2}{t_1}\right)}{\frac{t_2}{t_1 + t_2} \cdot \log_2\left(1 + \frac{s}{n_2}\right)} = \frac{\log_2(2)}{\frac{1}{2}\log_2(101)} = \frac{1}{3.3}. \quad \text{Eq (9)}$$

Equation (9) indicates that, for the exemplary scenario described above, an approximately 70% loss in capacity may result from discarding the first portion of the OFDM symbol observing high interference and processing only the second portion of the OFDM symbol with weights $w_1=0$ and $w_1=1$. This loss in capacity may be due to inter-subcarrier interference, which may result from loss of orthogonality between subcarriers when the first portion of the OFDM symbol is discarded.

In another aspect, a transmitter may send a transmission symbol such that a receiver can ignore a portion of a symbol period with high interference. This technique may be referred to as a non-transparent solution because of involvement by the transmitter to mitigate high interference observed by the receiver. This technique may avoid a loss in capacity due to inter-subcarrier interference described above. In general, a transmitter of a desired signal may be aware of interference conditions observed by a receiver and may adaptively modify the desired signal in order to reduce the impact of high interference observed by the receiver. The non-transparent solution may be used for any type of transmission symbol. For clarity, application of the non-transparent solution to OFDM symbols is described below.

Figure 5:
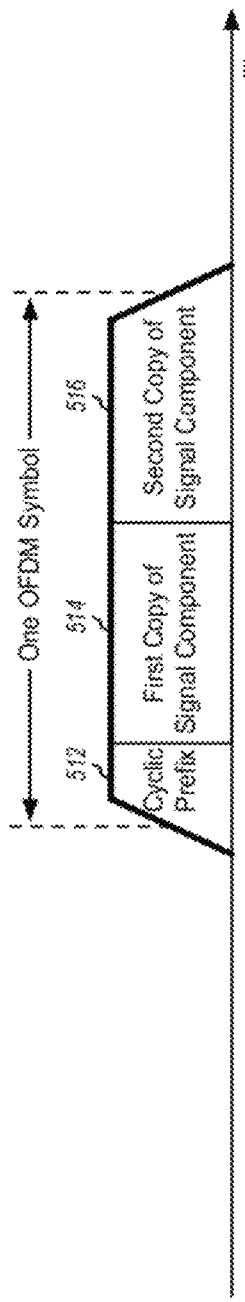
FIG. 5 shows an OFDM symbol with two copies of a signal component.

FIG. 5 shows a design of generating a fractional OFDM symbol comprising two copies of a signal component. In this design, a transmitter may generate an OFDM symbol using only subcarriers with even-numbered indices and setting subcarriers with odd-numbered indices to zero. The transmitter may map modulation symbols to even-numbered subcarriers, map zero symbols to odd-numbered subcarriers, and generate the OFDM symbol based on the mapped symbol. In this design, the OFDM symbol would include a cyclic prefix (CP) 512 followed by two identical copies 514 and 516 of a signal component, with each copy of the signal component occupying approximately one half of a symbol period. This OFDM symbol may be referred to as a fractional OFDM symbol.

A receiver may be able to recover the data sent in the OFDM symbol based on only one full copy of the signal component, or only half of the received OFDM symbol. In general, the receiver may obtain one full copy of the signal component from any part of the received OFDM symbol. However, to obtain good performance, the receiver should avoid using the portion of the OFDM symbol observing high interference.

The transmitter may send only half of the number of modulation symbols on even-numbered subcarriers in a fractional OFDM symbol. The transmitter may perform rate matching and subcarrier/tone mapping in various manners to send the modulation symbols in the fractional OFDM symbol. In one design, the transmitter may generate K modulation symbols for K available subcarriers in similar manner as if sending modulation symbols on all K available subcarriers. The transmitter may then delete (i.e., puncture) K/2 modulation symbols corresponding to K/2 odd-numbered subcarriers. The receiver may insert erasures for the K/2 modulation symbols deleted from the K/2 odd-numbered subcarriers. The erasures may correspond to LLRs of zero, which may indicate equal likelihood of '0' or '1' being sent. In another design, data may be rate matched around the punctured odd-numbered subcarriers in the fractional OFDM symbol. Rate matching may generate modulation symbols according to the number of resource elements available to send the modulation symbols, thereby avoiding the need for puncturing sensitive modulation symbols, such as modulation symbols generated based on systematic bits in the case of turbo coded codewords. In this design, the transmitter may generate K/2 modulation symbols for the K/2 even-numbered subcarriers (e.g., by adjusting a code rate used for coding) so that puncturing is not needed. Rate matching may provide better performance than puncturing, especially when the code rate is high.

FIG. 5 shows a design in which a fractional OFDM symbol is generated using only even-number subcarriers and includes two copies of the signal component. In general, a fractional OFDM symbol comprising M copies of the signal component may be generated by mapping modulation symbols to every M-th subcarrier and setting the remaining subcarriers to zero, where M may be any integer value. A receiver may recover the data sent in the fractional OFDM symbol based on at least one full copy of the signal component in a received OFDM symbol.

In an OFDM system, a cyclic prefix may be appended to each OFDM symbol to help mitigate inter-symbol interference. A fractional OFDM symbol may be generate with a cyclic prefix, as shown in FIG. 5. If the fractional OFDM symbol is generated using only even-numbered subcarriers, then the first and second half of the OFDM symbol would be identical. Hence, the first half of the OFDM symbol may act as a cyclic prefix for the second half of the OFDM symbol.

Figure 6:
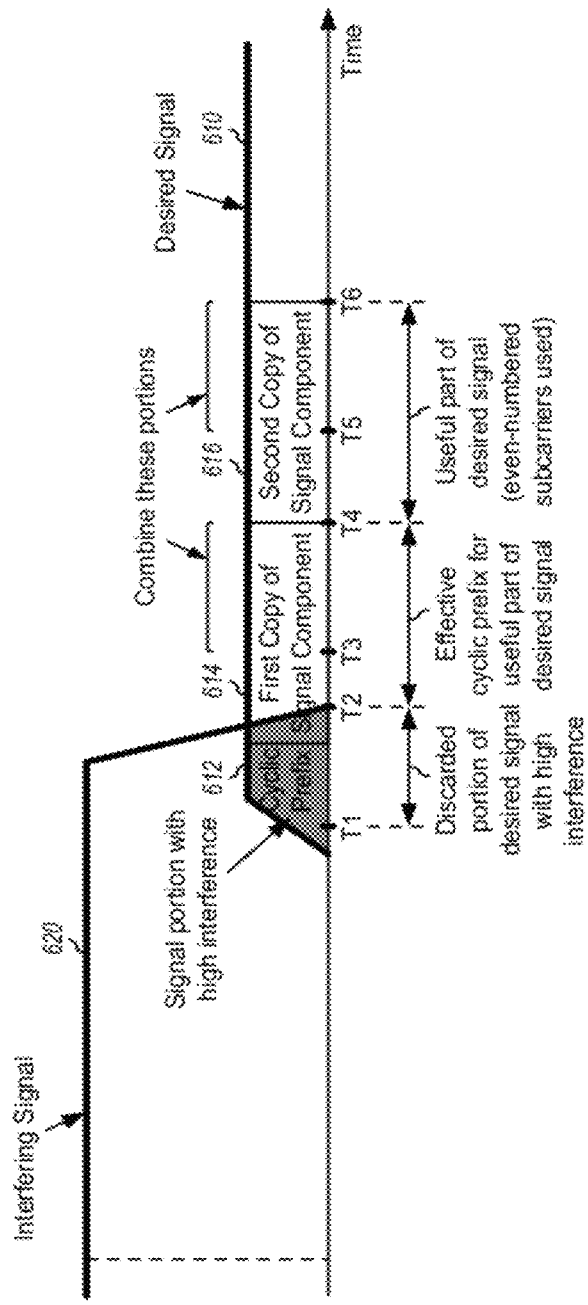
FIG. 6 shows combining of copies of the signal component to improve SINR.

FIG. 6 shows a design of combining different copies of a signal component of a fractional OFDM symbol to improve SINR. A desired signal 610 may include a fractional OFDM symbol comprising a cyclic prefix 612 followed by two copies 614 and 616 of a signal component. A large interfering signal 620 may overlap the first part of the fractional OFDM symbol from time T1 to time T2.

A receiver may discard the first part of the received OFDM symbol from time T1 to time T2 that overlaps interfering signal 620. The remaining part of the first copy 614 of the signal component from time T2 to time T4 may be considered as an effective cyclic prefix for the second copy 616 of the signal component. The receiver may discard a sufficient portion of the effective cyclic prefix to combat inter-symbol interference. The amount of cyclic prefix to discard should be larger than the delay spread for both a desired transmitter and an interfering transmitter. Delay spread for a transmitter is the time difference between the earliest arriving signal instance and the latest arriving signal instance from the transmitter at the receiver. The receiver may discard a portion of the effective cyclic prefix from time T2 to time T3. The receiver may combine the remaining portion of the effective cyclic prefix from time T3 to time T4 with the corresponding portion in the second copy 616 of the signal component from time T5 to time T6 to improve SINR.

A base station may schedule (i) a first set of UEs to transmit on every other subcarrier for the non-transparent solution and (ii) a second set of UEs to transmit on consecutive subcarriers. Scheduling these two sets of UEs in the same subframe may result in inter-subcarrier interference from the second set of UEs to the first set of UEs. The inter-subcarrier interference may be mitigated in various manners. In a first design, a guard band may be used between the first and second sets of UEs. The guard band may be obtained with a set of subcarriers (e.g., 12 subcarriers corresponding to one resource block) that is not used for transmission. In a second design, the first set of UEs may be scheduled on one side of the system bandwidth, and the second set of UEs may be scheduled on the other side of the system bandwidth. A guard band may or may not be used to separate the two sides of the system bandwidth. This design may reduce the amount of inter-subcarrier interference with or without a guard band.

In a third design, inter-subcarrier interference between the first and second sets of UEs may be mitigated by puncturing odd-number subcarriers for the second set of UEs and setting these subcarriers to zero. In a fourth design, inter-subcarrier interference may be mitigated by scheduling the first and second sets of UEs in different subframes. The first through fourth designs may also be extended to more than two sets of UEs.

For the non-transparent solution, a transmitter may generate a signal based on interference conditions observed by a receiver. In one design, the transmitter may send signaling to inform the receiver of the format of the signal generated by the transmitter. The signal format may change at a relatively slow time scale, and semi-static signaling may be sufficient.

In one design, the receiver may send signaling to inform the transmitter of the interference conditions observed by the receiver. The transmitter may use the information from the receiver to select a suitable signal format. The signaling between the transmitter and receiver may be supported in various manners and may also be conveyed through the backhaul between different base stations.

The techniques described herein may improve performance by mitigating high interference observed in only a portion of a transmission symbol. The techniques may include a transparent solution affecting only a receiver and a non-transparent solution affecting both a transmitter and a receiver. The techniques may be used for various transmission symbols such OFDM symbols, SC-FDMA symbols, CDMA symbols, etc. The techniques may also be used in various scenarios such as TDD, half-duplex FDD, heterogeneous, relay, peer-to-peer, etc.

Figure 7:
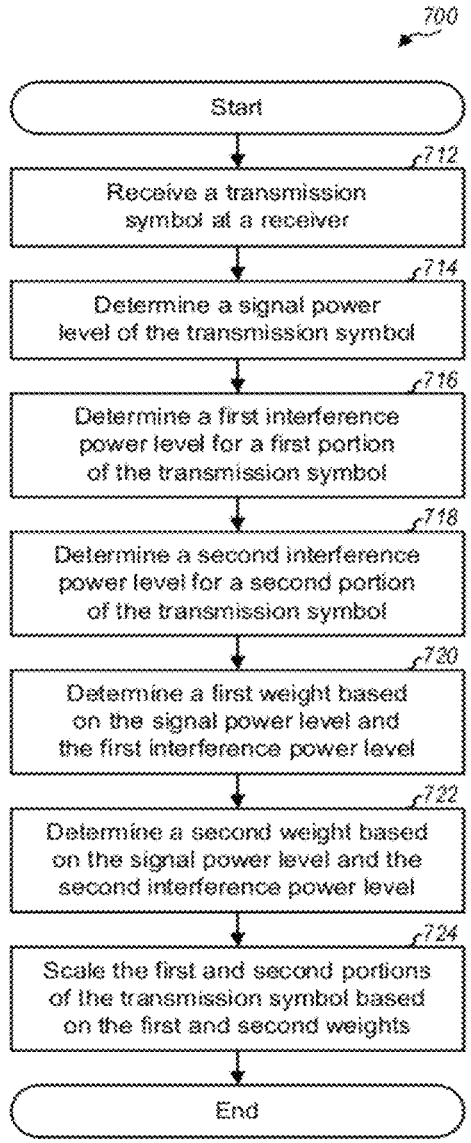
FIG. 7 shows a process for receiving data based on a transparent solution.

FIG. 7 shows a design of a process 700 for receiving data based on the transparent solution. Process 700 may be performed by a receiver, which may be a UE, a base station, or some other entity. The receiver may receive a transmission symbol, which may comprise an OFDM symbol, a SC-FDMA symbol, a CDMA symbol, etc. (block 712). The receiver may determine a signal power level s of the transmission symbol (block 714). The receiver may also determine a first interference power level $n_1$ for a first portion of the transmission symbol (block 716) and a second interference power level $n_2$ for a second portion of the transmission symbol (block 718). The receiver may determine a first weight $w_1$ based on the signal power level and the first interference power level, e.g., as shown in equation (1) or (3) (block 720). The receiver may determine a second weight $w_2$ based on the signal power level and the second interference power level, e.g., as shown in equation (2) or (4) (block 722). The receiver may determine the first and second weights based on MMSE solution or some other solution. The receiver may scale the first and second portions of the transmission symbol based on the first and second weights (block 724).

In one design, the receiver may determine the timing of an interfering transmitter at the receiver. The timing of the interfering transmitter may convey symbol boundaries of the interfering transmitter at the receiver. The receiver may determine the boundary of the first portion of the transmission symbol based on the timing of the interfering transmitter. In one design, the receiver may measure the first interference power level over a time period that is non-overlapping with the transmission symbol. In another design, the receiver may measure the received power of the first portion of the transmission symbol, measure the received power of the second portion of the transmission symbol, and determine the first interference power level based on the received power of the first portion and the received power of the second portion of the transmission symbol. The receiver may also determine the first portion of the transmission symbol and the first interference power level in other manners.

In one design of block 724, the receiver may scale samples corresponding to the first portion of the transmission symbol based on the first weight, e.g., as shown in equation (5). The receiver may scale samples corresponding to the second portion of the transmission symbol based on the second weight, e.g., as shown in equation (6). In another design, the receiver may determine LLRs for the first and second portions of the transmission symbol, e.g., based on received modulation symbols for the transmission symbol. The receiver may adjust the LLRs for the first portion of the transmission symbols based on the first weight and may adjust the LLRs for the second portion of the transmission symbols based on the second weight. The receiver may also scale the first and second portions of the transmission symbol based on the first and second weights in other manners.

Figure 8:
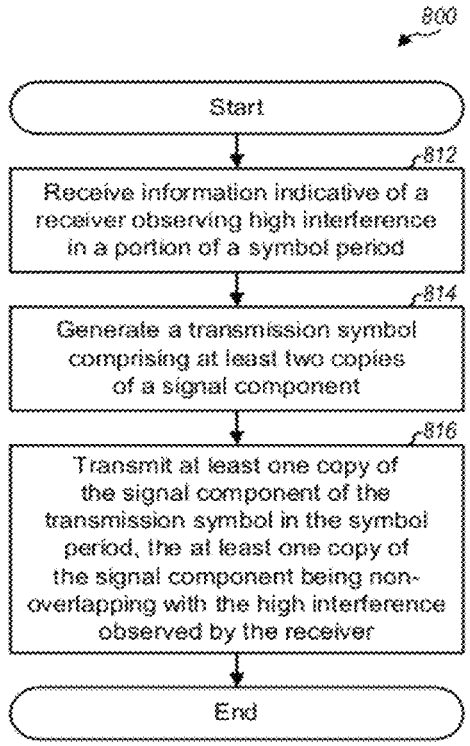
FIG. 8 shows a process for sending data based on a non-transparent solution.

FIG. 8 shows a design of a process 800 for transmitting data based on the non-transparent solution. Process 800 may be performed by a transmitter, which may be a UE, a base station, or some other entity. The transmitter may receive information indicative of a receiver observing high interference in a portion of a symbol period, e.g., from the receiver or some other entity (block 812). High interference may be quantified by interference power exceeding a particular threshold or based on some other criteria. The transmitter may generate a transmission symbol comprising at least two copies of a signal component (block 814). The transmitter may transmit at least one copy of the signal component of the transmission symbol in the symbol period (block 816). The at least one copy of the signal component may be non-overlapping with the high interference observed by the receiver. The transmitter may send signaling indicative of the transmission symbol comprising at least two copies of the signal component.

The transmission symbol may comprise an OFDM symbol, a SC-FDMA symbol, a CDMA symbol, etc. In one design of block 814, the transmitter may map modulation symbols to evenly spaced subcarriers, map zero symbols to remaining subcarriers, and generate the transmission symbol based on the mapped modulation symbols and zero symbols. In one design, the transmitter may map modulation symbols to even-number subcarriers or odd-number subcarriers to generate the transmission symbol comprising two copies of the signal component.

In one design of block 816, the transmitter may transmit all copies of the signal component of the transmission symbol. In another design, the transmitter may transmit a single copy of the signal component of the transmission symbol. In general, the transmitter may transmit all or a subset of the at least two copies of the signal component of the transmission symbol.

In one design, the transmitter may generate the transmission symbol occupying a set of evenly spaced subcarriers in a first part of system bandwidth. At least one guard band may separate the first part of the system bandwidth from at least one other part of the system bandwidth in which transmission symbols occupy contiguous subcarriers. In another design, transmission symbols occupying evenly spaced subcarriers and transmission symbols occupy contiguous subcarriers may be sent in different time interval. Both designs may mitigate inter-subcarrier interference to the transmission symbols occupying evenly spaced subcarriers.

Figure 9:
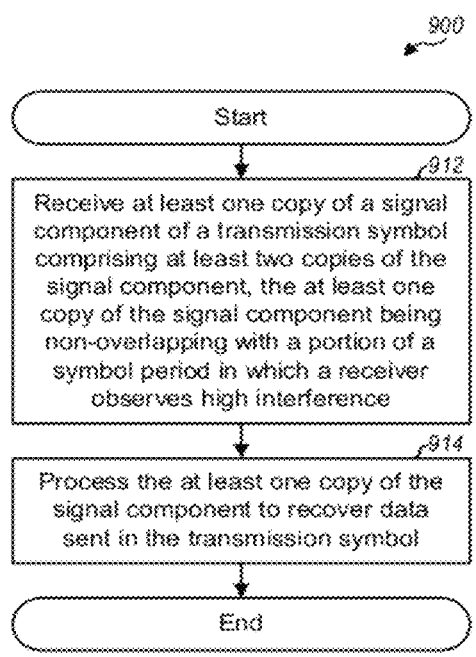
FIG. 9 shows a process for receiving data based on the non-transparent solution.

FIG. 9 shows a design of a process 900 for receiving data based on the non-transparent solution. Process 900 may be performed by a receiver, which may be a UE, a base station, or some other entity. The receiver may receive at least one copy of a signal component of a transmission symbol comprising at least two copies of the signal component (block 912). The transmission symbol may comprise an OFDM symbol, a SC-FDMA symbol, a CDMA symbol, etc. The at least one copy of the signal component may be non-overlapping with a portion of a symbol period in which the receiver observes high interference. The receiver may process the at least one copy of the signal component to recover data sent in the transmission symbol (block 914).

In one design, the receiver may receive a single copy of the signal component of the transmission symbol. In another design, the receiver may receive multiple copies of the signal component of the transmission symbol. The multiple copies may comprise a first copy and a second copy of the signal component. In one design, the receiver may combine a selected portion of the first copy of the signal component with a corresponding portion of the second copy of the signal component, e.g., as shown in FIG. 6. The receiver may obtain the selected portion of the first copy of the signal component by discarding (i) an initial portion of the first copy of the signal component that overlaps the high interference and/or (ii) a cyclic prefix portion of the first copy of the signal component. The receiver may process at least the combined portion of the first and second copies of the signal component to recover the data sent in the transmission symbol.

The receiver may identify high interference observed in a portion of the symbol period based on measurements made by the receiver for one or more interfering signals received from one or more interfering transmitters. In one design, the receiver may send information indicative of the receiver observing high interference in the portion of the symbol period. In one design, the receiver may receive signaling indicative of the transmission symbol comprising at least two copies of the signal component.

Figure 10:
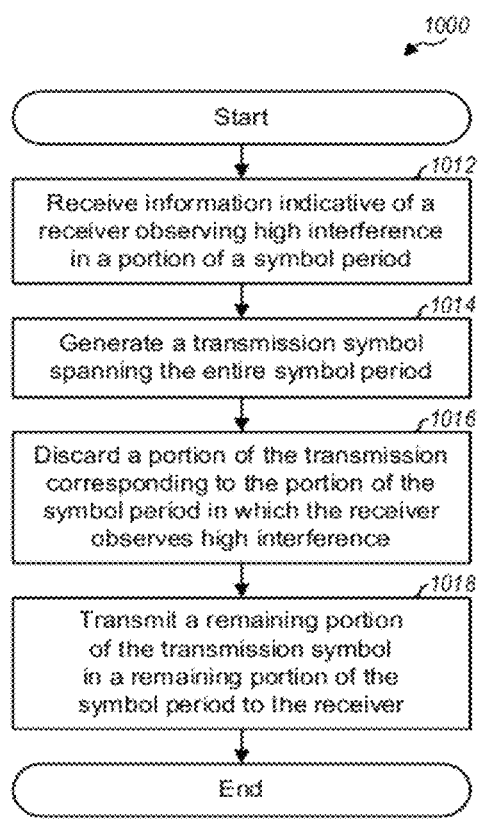
FIG. 10 shows a process for sending data based on the non-transparent solution.

FIG. 10 shows a design of a process 1000 for transmitting data based on the non-transparent solution. Process 1000 may be performed by a transmitter, which may be a UE, a base station, or some other entity. The transmitter may receive information indicative of a receiver observing high interference in a portion of a symbol period (block 1012). The receiver may generate a transmission symbol (e.g., an OFDM symbol, a SC-FDMA symbol, a CDMA symbol, etc.) spanning the entire symbol period (block 1014). The transmitter may discard a portion of the transmission symbol corresponding to the portion of the symbol period in which the receiver observes high interference (block 1016). The transmitter may transmit the remaining portion of the transmission symbol in the remaining portion of the symbol period to the receiver (block 1018).

Figure 11:
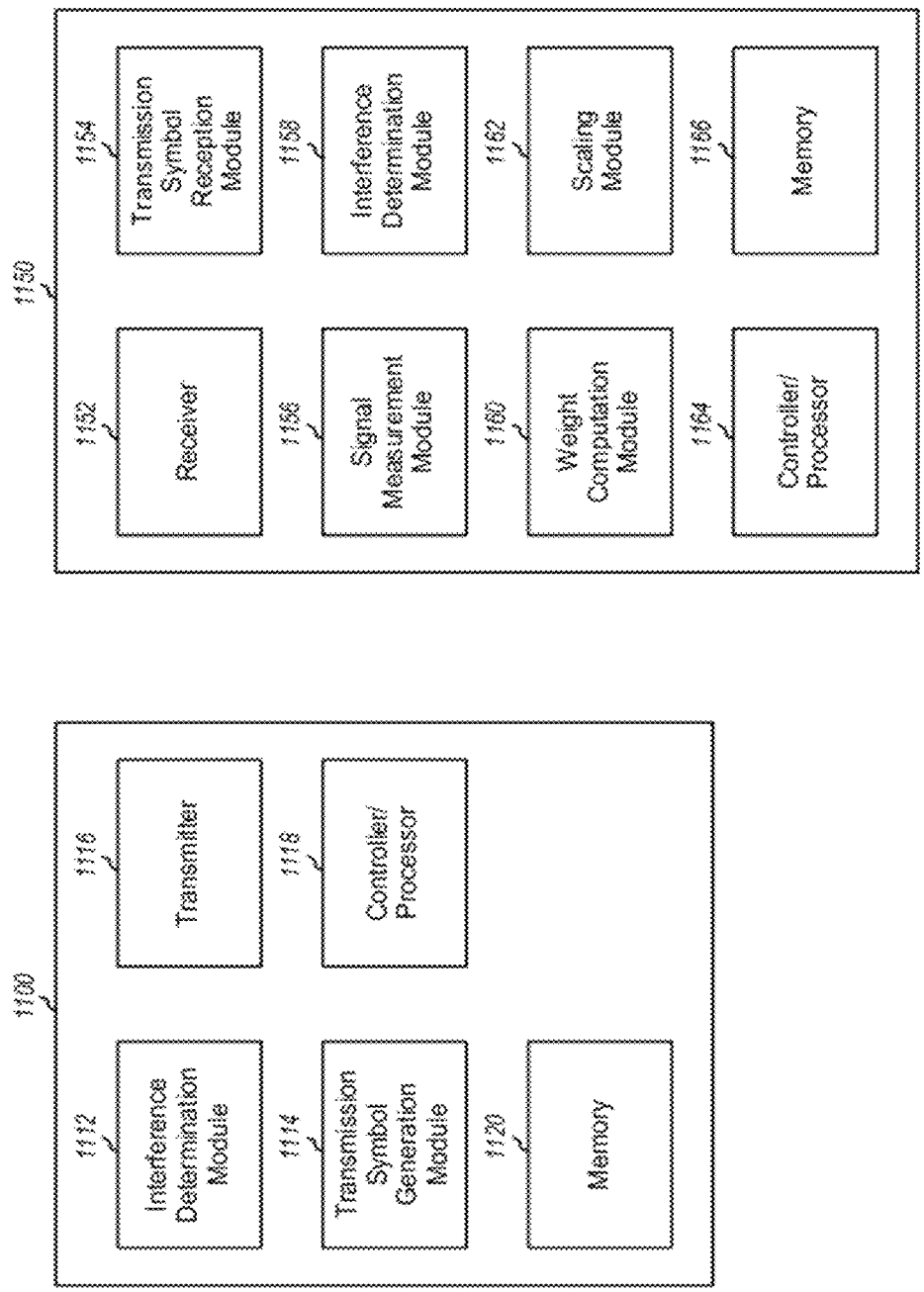
FIG. 11 shows a block diagram of a transmitter and a receiver.

FIG. 11 shows a block diagram of a design of a transmitter 1100 and a receiver 1150. Transmitter 1100 may be part of a UE, a base station, or some other entity. Receiver 1150 may be part of a base station, a UE, or some other entity.

Within transmitter 1100, a module 1112 may identify one or more receivers observing high interference in a portion of a symbol period, e.g., based on information sent by the receiver(s) and/or information obtained from some other entity. A module 1114 may generate transmission symbols (e.g., OFDM symbols, SC-FDMA symbols, CDMA symbols, etc.) to send to one or more receivers (e.g., receiver 1150). In one design, module 1114 may generate a transmission symbol comprising multiple copies of a signal component and may send at least one copy of the signal component, as described above. For example, module 1114 may generate the transmission symbol occupying evenly spaced subcarriers, with the remaining subcarriers being set to zero. In another design, module 1114 may generate a transmission symbol for an entire symbol period and may send a fraction of the transmission symbol, as also described above. A transmitter unit 1116 may generate a modulated signal comprising the transmission symbols to send to one or more receivers and may transmit the modulated signal. A controller/processor 1118 may direct the operation of various modules within transmitter 1100. A memory 1120 may store data and program codes for transmitter 1100.

Within receiver 1150, a receiver unit 1152 may receive modulated signals from transmitter 1100 and other transmitters, e.g., interfering transmitters. A module 1154 may process a received signal from receiver unit 1152 to obtain transmission symbols sent to receiver 1150. A module 1156 may measure received power of the received signal in different time periods. A module 1158 may detect high interference from one or more interfering transmitters and may determine the interference power levels of different portions of a transmission symbol. For the transparent solution, a module 1160 may determine weights for different portions of a transmission symbol observing different interference power levels. A module 1162 may scale different portions of the transmission symbol based on the weights. For the non-transparent solution, module 1154 may obtain at least one copy of a signal component in a transmission symbol. Module 1154 may discard one or more copies of the signal component that overlap a portion of a symbol period in which receiver 1150 observes high interference. A controller/processor 1164 may direct the operation of various modules within receiver 1150. A memory 1166 may store data and program codes for receiver 1150.

Figure 12:
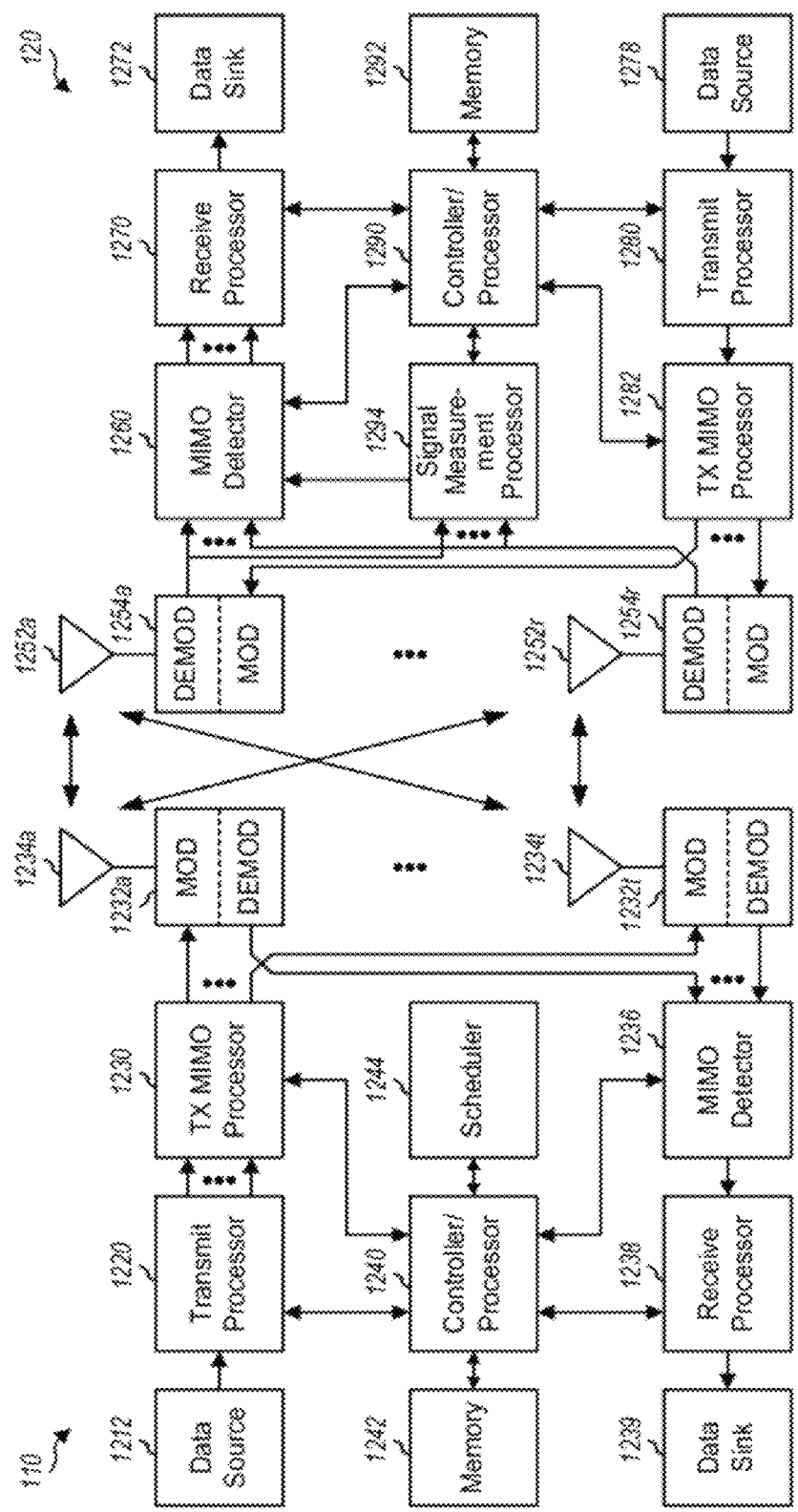
FIG. 12 shows a block diagram of a base station and a UE.

FIG. 12 shows a block diagram of a design of a base station 110 and a UE 120, which may be one of the base stations and one of the UEs in FIG. 1. Base station 110 may be equipped with T antennas 1234a through 1234t, and UE 120 may be equipped with R antennas 1252a through 1252r, where in general T≥1 and R≥1.

At base station 110, a transmit processor 1220 may receive data from a data source 1212 for one or more UEs, process (e.g., encode and modulate) the data for each UE based on one or more modulation and coding schemes selected for that UE, and provide data symbols for all UE. Transmit processor 1220 may also process signaling/control information and provide control symbols. Transmit processor 1220 may also generate reference symbols for a reference signal for each cell supported by base station 110. A transmit multiple-input multiple-output (TX MIMO) processor 1230 may precode the data symbols, the control symbols, and/or the reference symbols (if applicable) and may provide T output symbol streams to T modulators (MOD) 1232a through 1232t. Each modulator 1232 may process its output symbol stream (e.g., for OFDM) to obtain an output sample stream. Each modulator 1232 may further condition (e.g., convert to analog, filter, amplify, and upconvert) its output sample stream and generate a downlink signal. T downlink signals from modulators 1232a through 1232t may be transmitted via T antennas 1234a through 1234t, respectively.

At UE 120, R antennas 1252a through 1252r may receive the T downlink signals from base station 110, and each antenna 1252 may provide a received signal to an associated demodulator (DEMOD) 1254. Each demodulator 1254 may condition (e.g., filter, amplify, downconvert, and digitize) its received signal to obtain samples and may further process the samples (e.g., for OFDM) to obtain received symbols. A MIMO detector 1260 may perform MIMO detection on the received symbols (if applicable) and provide detected symbols. A receive processor 1270 may process (e.g., demodulate and decode) the detected symbols and provide decoded data for UE 120 to a data sink 1272. A signal measurement processor 1294 may make measurements of the R received signals to identify portions of a transmission symbol observing different interference power levels. Processor 1294 may also measure the signal power level and the interference power levels for different portions of the transmission symbol.

On the uplink, data from a data source 1278 and signaling from controller/processor 1290 may be processed (e.g., encoded and modulated) by a transmit processor 1280, spatially processed by a TX MIMO processor 1282 (if applicable), and further processed by modulators 1254a through 1254r to generate R uplink signals, which may be transmitted via antennas 1252a through 1252r. At base station 110, the R uplink signals from UE 120 may be received by antennas 1234a through 1234t, processed by demodulators 1232a through 1232t, detected by a MIMO detector 1236 (if applicable), and further processed (e.g., demodulated and decoded) by a receive processor 1238 to recover the data and signaling sent by UE 120. The recovered data may be provided to a data sink 1239, and the recovered signaling may be provided to processor 1240.

Controllers/processors 1240 and 1290 may direct the operation at base station 110 and UE 120, respectively. Processor 1240 and/or other processors and modules at base station 110 may perform or direct process 700 in FIG. 7, process 800 in FIG. 8, process 900 in FIG. 9, process 1000 in FIG. 10, and/or other processes for the techniques described herein. Processor 1290 and/or other processors and modules at UE 120 may perform or direct process 700, process 800, process 900, process 1000, and/or other processes for the techniques described herein. Memories 1242 and 1292 may store data and program codes for base station 110 and UE 120, respectively. A scheduler 1244 may schedule UE 120 and/or other UEs for data transmission on the downlink and/or uplink and may assign resources (e.g., subcarriers) to the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
receiving information indicative of a receiver observing interference in a portion of a symbol period;
generating a transmission symbol including a cyclic prefix and at least two copies of a signal component based on the information indicative of the receiver observing interference; and
transmitting at least one copy of the signal component of the transmission symbol in the symbol period, the at least one copy of the signal component being non-overlapping with the interference observed by the receiver.

2. The method of claim 1, wherein the generating the transmission symbol includes:
mapping modulation symbols to evenly spaced subcarriers;
mapping zero symbols to remaining subcarriers; and
generating the transmission symbol based on the mapped modulation symbols and the mapped zero symbols.

3. The method of claim 1, wherein the generating the transmission symbol includes mapping modulation symbols to subcarriers with even-number indices or subcarriers with odd-number indices to generate the transmission symbol including two copies of the signal component.

4. The method of claim 1, wherein the transmitting the at least one copy of the signal component includes transmitting all copies of the signal component of the transmission symbol.

5. The method of claim 1, wherein the transmitting the at least one copy of the signal component includes transmitting only a single copy of the signal component of the transmission symbol.

6. The method of claim 1, further including sending signaling indicative of the transmission symbol including at least two copies of the signal component.

7. The method of claim 1, wherein the generating the transmission symbol includes generating the transmission symbol occupying a set of evenly spaced subcarriers in a first part of system bandwidth, wherein at least one guard band separates the first part of the system bandwidth from at least one other part of the system bandwidth in which transmission symbols occupy contiguous subcarriers.

8. The method of claim 1, wherein the transmission symbol includes one of an Orthogonal Frequency Division Multiplexing (OFDM) symbol, a Single-Carrier Frequency Division Multiple Access (SC-FDMA) symbol, and a Code Division Multiple Access (CDMA) symbol.

9. An apparatus for wireless communication, comprising:
means for receiving information indicative of a receiver observing interference in a portion of a symbol period;
means for generating a transmission symbol including a cyclic prefix and at least two copies of a signal component based on the information indicative of the receiver observing interference; and
means for transmitting at least one copy of the signal component of the transmission symbol in the symbol period, the at least one copy of the signal component being non-overlapping with the interference observed by the receiver.

10. The apparatus of claim 9, wherein the means for generating the transmission symbol includes:
means for mapping modulation symbols to evenly spaced subcarriers;
means for mapping zero symbols to remaining subcarriers; and
means for generating the transmission symbol based on the mapped modulation symbols and the mapped zero symbols.

11. The apparatus of claim 9, further including means for sending signaling indicative of the transmission symbol including at least two copies of the signal component.

12. An apparatus for wireless communication, comprising:
at least one processor configured to receive information indicative of a receiver observing interference in a portion of a symbol period, to generate a transmission symbol including a cyclic prefix and at least two copies of a signal component based on the information indicative of the receiver observing interference, and to transmit at least one copy of the signal component of the transmission symbol in the symbol period, the at least one copy of the signal component being non-overlapping with the interference observed by the receiver.

13. The apparatus of claim 12, wherein the at least one processor is configured to map modulation symbols to evenly spaced subcarriers, to map zero symbols to remaining subcarriers, and to generate the transmission symbol based on the mapped modulation symbols and the mapped zero symbols.

14. The apparatus of claim 12, wherein the at least one processor is configured to send signaling indicative of the transmission symbol including at least two copies of the signal component.

15. A computer program product comprising a non-transitory computer-readable storage medium, the non-transitory computer-readable storage medium comprising:
instructions for causing at least one processor to receive information indicative of a receiver observing interference in a portion of a symbol period;
instructions for causing the at least one processor to generate a transmission symbol including a cyclic prefix and at least two copies of a signal component based on the information indicative of the receiver observing interference; and
instructions for causing the at least one processor to transmit at least one copy of the signal component of the transmission symbol in the symbol period, the at least one copy of the signal component being non-overlapping with the interference observed by the receiver.

16. A method for wireless communication, comprising:
receiving, at a receiver, a transmission symbol comprising a cyclic prefix, a first copy of a signal component, and a second copy of the signal component;
combining a selected portion of the first copy of the signal component with a corresponding portion of the second copy of the signal component, wherein the receiver obtains the selected portion of the first copy by discarding a portion of the first copy of the signal component that overlaps with an interfering signal observed by the receiver; and
recovering, based at least on the combined portions, data sent in the transmission symbol.

17. The method of claim 16, wherein the obtaining the selected portion of the first copy of the signal component by discarding a portion of the first copy of the signal component that overlaps with an interfering signal further comprises discarding the cyclic prefix of the transmission symbol.

18. The method of claim 16, further comprising:
identifying the interfering signal observed by the receiver.

19. The method of claim 16, further comprising:
sending, to a transmitter of the transmission symbol, information indicative of the receiver observing the interfering signal in a portion of a symbol period.

20. The method of claim 16, further comprising:
receiving signaling indicative of the transmission symbol including at least two copies of the signal component.

21. The method of claim 16, wherein the transmission symbol includes one of an Orthogonal Frequency Division Multiplexing (OFDM) symbol, a Single-Carrier Frequency Division Multiple Access (SC-FDMA) symbol, and a Code Division Multiple Access (CDMA) symbol.

22. An apparatus for wireless communication, comprising:
means for receiving a transmission symbol comprising a cyclic prefix, a first copy of a signal component, and a second copy of the signal component;
means for combining a selected portion of the first copy of the signal component with a corresponding portion of the second copy of the signal component, wherein the means for receiving obtains the selected portion of the first copy by discarding a portion of the first copy of the signal component that overlaps with an interfering signal observed by the means for receiving; and
means for recovering, based at least on the combined portions, data sent in the transmission symbol.

23. The apparatus of claim 22, further comprising:
means for sending, to a transmitter of the transmission symbol, information indicative of the receiver observing the interfering signal in a portion of a symbol period.

24. The apparatus of claim 22, further comprising:
means for receiving signaling indicative of the transmission symbol including at least two copies of the signal component.

25. An apparatus for wireless communication, comprising:
at least one processor configured to receive a transmission symbol comprising a cyclic prefix, a first copy of a signal component, and a second copy of the signal component, to combine a selected portion of the first copy of the signal component with a corresponding portion of the second copy of the signal component, wherein the selected portion of the first copy is obtained by discarding a portion of the first copy of the signal component that overlaps with an observed interfering signal, and to recover, based at least on the combined portions, data sent in the transmission symbol.

26. The apparatus of claim 25, wherein the at least one processor is configured to send, to a transmitter of the transmission symbol, information indicative of the receiver observing the interfering signal in a portion of a symbol period.

27. The apparatus of claim 25, wherein the at least one processor is configured to receive signaling indicative of the transmission symbol including at least two copies of the signal component.

* * * * *